United States Patent Office 3,093,355
Patented June 11, 1963

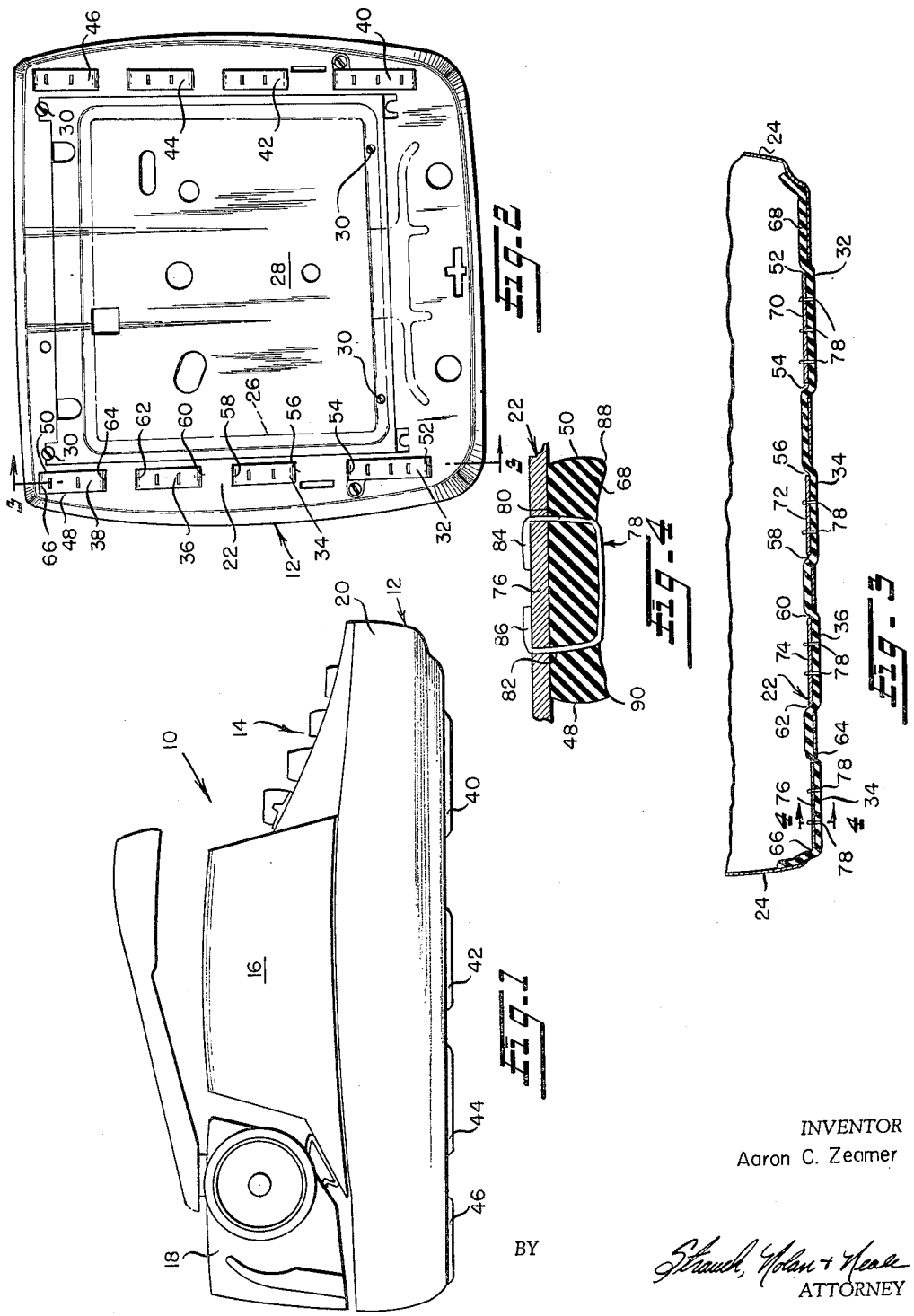

3,093,355
MACHINE SUPPORT STRUCTURE
Aaron C. Zeamer, Groton, N.Y., assignor to Smith-Corona Marchant, Inc., Syracuse, N.Y., a corporation of New York
Filed Aug. 29, 1960, Ser. No. 52,570
7 Claims. (Cl. 248—24)

The present invention relates to improvements in machine support structures and more particularly to improvements in support structures for movable carriage machines such as typewriters and the like.

Heretofore it has been customary to provide as a support for movable carriage typewriters and the like four rubber feet usually of circular cross section and individually mounted upon the under side of the machine base structure. As is well known to those who have operated typewriters and other movable carriage office machines, the force required to return the carriage and the impact force of the carriage at the end of its carriage return operation tend to move the entire typewriter relative to the desk or other surface upon which the typewriter is supported. This results from the relatively low force required to produce slippage between the rubber feet and the supporting surface, this force becoming less as the typewriter is used due to dust becoming embedded in the surface of the rubber feet and thereby reducing the coefficient of friction between the feet and the supporting surface.

To eliminate this difficulty it has become customary in installing semi-permanently located machines to provide rigid metal studs or bolts rigidly fixed to the underside of the typewriter base and projecting into interlocking apertures in the typewriter supporting surfaces of especially constructed typewriter desks. While this solves the problem of machine movement where applicable, it is applicable only where such especially constructed desks are used, requires a more or less tailor made installation of the typewriter, constitutes an additional expense, and is not applicable at all where the typewriter is to be used in a number of different locations as is common with portable typewriters.

The poor surface gripping capacity of the typewriter feet used heretofore is attributable in part to the relatively low total surface, and the concomitant concentration of the machine weight upon the relatively small bodies of rubber with the resultant necessity of using a relatively hard rubber for these feet to support the weight of the machine without deformation to the extent that the metal machine base will contact the supporting surface.

In addition to having poor surface gripping capacity, the prior art circular feet, being individually mounted, usually by screws and washers, must be of a relatively large height resulting in a higher center of gravity of the machine and a greater effective leverage of the carriage movement generated forces relative to the plane of the engaged surfaces of the feet and supporting surface thereby resulting in a greater ease of movement of the entire machine under the carriage movement generated forces.

With the foregoing considerations in view, it is the principal object of this invention to provide a base structure for movable carriage machines such as typewriters and the like which will so frictionally engage a supporting surface as to substantially completely prevent movement of the machine relative to said surface.

More specifically it is an object of this invention to provide a base structure for movable carriage equipped office machines which will so frictionally engage a supporting surface as to substantially completely prevent movement of the machine relative to such surface, particularly during the operation of the carriage return mechanism thereof.

More specifically it is an object of this invention to provide a support structure for movable carriage machines such as typewriters which embodies a plurality of elastomeric feet, preferably rubber or a rubber substitute providing a high coefficient of friction upon engagement with the usual metal, polished wood or glass machine support surfaces, having elongated lateral edges extending transversely of the direction of movement of the carriage relative to the base formed to frictionally engage such a supporting surface for the machine to thereby oppose movement of the machine relative to such surface.

A further object of this invention is to provide a support structure for movable carriage machines such as typewriters which embodies, at each side of the bottom face of the base of the machine, a row of relatively soft elastomeric substantially rectangular pads of uniform thickness providing a relatively large area high friction surface for frictional engagement with the machines' supporting surface.

A further object of this invention is to provide a support structure for movable carriage machines such as typewriters which embodies at each side of the bottom face of the base of the machine, a row of relatively soft elastomeric substantially rectangular pads of uniform thickness providing a relatively large area high frictional surface for frictional engagement with the machine supporting surface in which the rows of pads are formed by an elongated elastomeric strip extending transversely of the direction of movement of the carriage relative to the base from the front to the rear of the machine base and woven through spaced apertures in the base so that alternate portions thereof lie internally and externally of such base.

A further object of this invention is to provide a support structure for movable carriage machines such as a typewriter which embodies, at each side of the bottom face of the base of the machine, a row of relatively soft elastomeric substantially rectangular pads of uniform thickness providing a relatively large area high friction surface for frictional engagement with the machine supporting surface in which the feet are secured to the base by fastening devices compressing the central portions of such feet and contracting the spacing between the portions of the lateral edges thereof so that such lateral edge portions are adapted to directly engage a machine supporting surface.

A further object of this invention is to provide a support structure for movable carriage machines such as a typewriter which embodies at each side of the bottom face of the base of the machine, a row of relatively soft elastomeric substantially rectangular pads of uniform thickness providing a relatively large area high friction surface for frictional engagement with the machine supporting surface in which the feet are secured to the base fastening devices compressing the central portions of such feet and contracting the spacing between the portions of the lateral edges thereof so that such lateral edge portions are adapted to directly engage a machine supporting surface and in which the pads are thin elastomeric strips stapled to the base plate of the machine so that the overall height of the machine attributable to such feet is no greater than the thickness of said strips.

These and other objects of the present invention, will become more fully apparent by reference to the appended claims and as the following detailed description proceeds in reference to the accompanying drawings wherein:

FIGURE 1 is a side elevational view of a typewriter type movable carriage office machine embodying a support structure constructed in accord with the principles of the present invention;

FIGURE 2 is a bottom plan view of the machine illustrated in FIGURE 1;

FIGURE 3 is a sectional view taken substantially along the line 3—3 of FIGURE 2; and FIGURE 4 is a fragmentary sectional view taken substantially along the line 4—4 of FIGURE 3.

Referring now to the drawings in detail and particularly to FIGURE 1, the typewriter 10 therein illustrated is a portable machine and embodies a base structure 12 having a keyboard mechanism 14 at the front thereof, a housed printing mechanism 16 in the form of a plurality of individually actuatable type bars (not shown) conventionally, arcuately arranged in a type-basket, and a laterally movable paper supporting and feeding carriage mechanism 18.

Referring to FIGURES 1, 2 and 3, the base structure 12 embodies a metal stamping 20 having a substantially flat bottom wall 22 and an upstanding marginal wall 24 extending about all four sides of the base wall 22. As is best shown in FIGURE 2, the bottom wall 22 is provided with a central access opening 26 normally closed by a cover 28 fixed to the bottom wall 22 by screws 30.

With continued reference to FIGURE 2, the support structure 12 is provided at its opposite lateral edges with rows of elastomeric feet, the feet in the left hand row as viewed in FIGURE 2 being designated 32, 34, 36 and 38 and those in the right hand row as viewed in FIGURE 2 being designated 40, 42, 44 and 46. As will be noted each set of feet 30–46 are of generally rectangular configuration, the feet 32 and 40 adjacent the front of the base 12, that is beneath the keyboard 14, having greater bottom surface areas than the surface areas of the remainder of the feet 34–38 and 42–46 and each of the feet being provided with long lateral edges 48 and 50 extending transversely of the path of movement of the carriage 18 relative to the base structure 12. It will be noted that the length of the feet 32–38 and 40–46 longitudinally of the rows in which they are located is substantially greater than the spacing between the feet so that a large surface area is provided for frictional engagement with the surface of a desk or other supporting surface. As is clear from a comparison of FIGURES 2 and 3, the bottom wall 22 of the base member 20 is provided with a plurality of generally rectangular apertures extending transversely of the rows of feet, one aperture being located at each end of each of the feet, the apertures at the opposite end of foot 32 being designated 52 and 54, those at the opposite ends of foot 34 being designated 56 and 58, those at the opposite ends of foot 36 being designated 60 and 62 and those at the opposite end of foot 38 being designated 64 and 66. These apertures 52–66 have a length transversely of the row substantially equal to the width of the feet 32–38 and a width longitudinally of the row in which the feet 32–38 are located substantially equal to the thickness of the elastomeric material of which the feet 32–38 are formed.

As is most clearly shown in FIGURE 3, the feet 32, 34, 36 and 38 are formed from a single strip 68 of elastomeric material which is woven through the apertures 52–66 so that alternate portions lie internally of the base member 20 and alternate portions lie externally of the base member 20 to define the feet 32, 34, 36 and 38. To facilitate this weaving of the strip 68 through the apertures 52–66 and also to lower the overall height of the machine 10, the portions 70, 72, 74 and 76 of the bottom wall 22 of the base 20 immediately above the feet 32, 34, 36 and 38 respectively are raised slightly relative to the plane of the bottom wall 22 as is most clearly shown in FIGURE 3. This is effected in the stamping of member 20.

The feet 32, 34, 36 and 38 are secured to portions 70, 72, 74 and 76, respectively, by fastening devices in the form of metal staples 78 which as is best shown in FIGURE 4 in connection with foot 38, extend transversely of the longitudinal dimension of the strip 68 and have leg portions 80 and 82 extending through the strip 68 adjacent its lateral edges 48 and 50 and through the portion of the bottom wall 22 immediately above the feet, portion 76 for foot 36, and turned over portions 84 and 86 firmly locking the strip 68 to the bottom wall 22. The height of the legs 80 and 82 is sufficiently less than the thickness of the strip 68 so that the central portions of the strip 68 is compressed to less than its normal thickness with the result that the spacing between the edge corners 88 and 90 is contracted to less than its normal spacing so that the edge corners 88 and 90 are directly in engagement with the supporting structure for the machine to provide a good frictional engagement between the machine supporting surface and the feet of the machine.

The feet 40, 42, 44, and 46 in the opposite lateral row are formed and mounted in the same manner as described in reference to the feet 32–38.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. In combination with a movable carriage machine, a base structure comprising a base member having a substantially flat bottom face and friction means fixed to said base member bottom face adapted to frictionally engage a support surface for such a machine to completely prevent material slippage of said machine relative to such surface, said means comprising a plurality of rows of thin support feet fixed to said base member bottom face and formed of thin elastomeric material, each of said feet in each of said rows being a part of a single elastomeric strip.

2. In combination with a machine provided with a movable carriage, a base structure comprising a base member having a substantially flat bottom face and friction means fixed to said base member bottom face adapted to frictionally engage a support surface for such a machine to completely prevent material slippage of said machine relative to such a surface incident to the movement to the carriage thereof relative to said base structure said means comprising a plurality of rows of thin support feet fixed to said base member bottom face and formed of thin elastomeric material, said feet each being of substantially rectangular cross section parallel to said base member bottom face, said feet being secured to said bottom face by fastening devices compressing the central portions of said feet to a thickness less than the thickness of said feet at the lateral edges thereof and contracting the spacing between said lateral edges so that said lateral edges can directly frictionally engage such a machine support surface.

3. In combination with a machine provided with a movable carriage, a base structure comprising a base member having a substantially flat bottom face and friction means fixed to said base member bottom face adapted to frictionally engage a support surface for such a machine to completely prevent material slippage of said machine relative to such a surface incident to the movement of the carriage thereof relative to said base structure, said means comprising a plurality of rows of thin support feet formed of thin elastomeric material, said feet each being of substantially rectangular cross section parallel to said base member bottom face, said base member being formed with a plurality of openings extending transversely of said rows, one at each end of each of said feet, each of said openings having a width substantially equal to the thickness of said feet and a length substantially equal to the width of said feet, each of said feet comprising a portion of a strip of elastomeric material projecting at each end of each such feet through the adjacent ones of said openings of said bottom face into the interior of said base structure.

4. The combination defined in claim 3 wherein said feet are secured to said bottom face by fastening devices compressing the central portions of said feet to a thickness less than the thickness of said feet at the lateral edges thereof and contracting the spacing between said lateral edges so that said lateral edges can directly frictionally engage such a machine support surface.

5. The combination defined in claim 4 wherein said fastening devices are metal staples.

6. The combination defined in claim 3 wherein each of said feet in each of said rows is a part of a single elastomeric strip.

7. The combination defined in claim 3 wherein the portion of said bottom face above each of said feet is disposed in a plane above the plane of the remainder of said bottom face a distance less than the thickness of said feet.

References Cited in the file of this patent

UNITED STATES PATENTS

| | | |
|---|---|---|
| 1,173,538 | Roberts | Feb. 29, 1916 |
| 2,540,296 | Schwend | Feb. 6, 1951 |

FOREIGN PATENTS

| | | |
|---|---|---|
| 303,004 | Great Britain | Aug. 29, 1929 |